United States Patent
Purcell, Jr. et al.

[11] 3,741,429
[45] June 26, 1973

[54] BICYCLE CANTEEN
[75] Inventors: Jack A. Purcell, Jr., Taylor; Jerome A. Leonard, Walled Lake; John S. Juratovic, Detroit, all of Mich.
[73] Assignee: Bort, Inc., Hazel Park, Mich.
[22] Filed: Jan. 25, 1971
[21] Appl. No.: 109,498

[52] U.S. Cl. ................ 220/18, 150/.5, 220/3.1, 224/30 R, 280/289
[51] Int. Cl. ............................................ B65d 25/24
[58] Field of Search ............... 248/214, 221, 230, 248/231; 224/30 R, 31, 35, 39; 280/202, 289, 5 H, 5 A; 180/35; 220/18, 3.1; 150/.5

[56] References Cited
UNITED STATES PATENTS

| | | | |
|---|---|---|---|
| 991,844 | 5/1911 | Gillette | 220/3.1 |
| 1,913,806 | 6/1933 | High | 220/18 |
| 3,552,599 | 1/1971 | Redding | 150/.5 |
| 3,113,693 | 12/1963 | Stoll | 220/60 R |
| 2,680,533 | 6/1954 | Cole | 220/18 |
| 2,550,200 | 4/1951 | Murrell | 248/214 |
| 657,529 | 9/1900 | Fesler | 224/35 |
| 604,988 | 5/1898 | Knopping | 224/35 |
| 2,051,823 | 8/1936 | Clarke | 224/35 |

FOREIGN PATENTS OR APPLICATIONS

| | | | |
|---|---|---|---|
| 1,100,522 | 9/1955 | France | 180/35 |

Primary Examiner—Herbert F. Ross
Assistant Examiner—Stephen Marcus
Attorney—Russel C. Wells

[57] ABSTRACT

A bicycle canteen having a unitary rigid structure is provided with a universal clamping means for securing the canteen to either singular or dual membered main crossbars of a bicycle. The canteen is secured along the main crossbar of a bicycle between the forward end of the seat and the handlebar fork member. A combination inlet cap and cup is provided to seal the canteen making it liquid-proof after the canteen is filled and provide a cup to act as a receptacle when the liquid is removed from the canteen. The canteen takes the general shape of fuel tanks such as found on motorcycles and is basically speed-form or aero-dynamically shaped.

5 Claims, 13 Drawing Figures

PATENTED JUN 26 1973 3,741,429
SHEET 1 OF 2
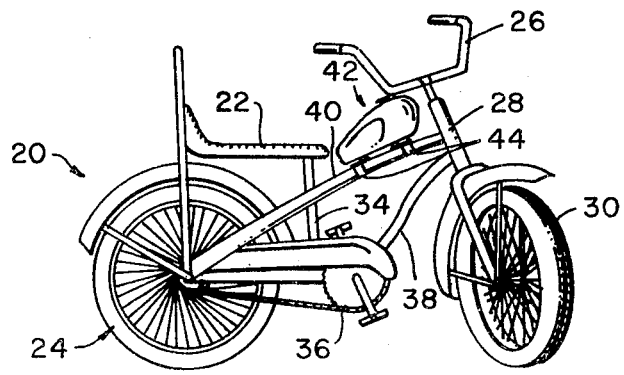
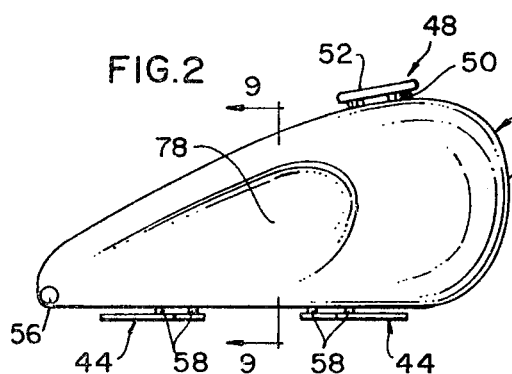
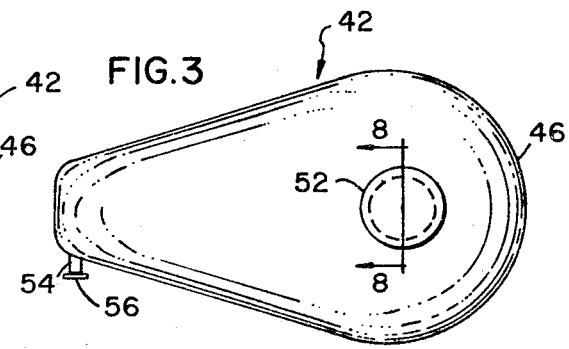
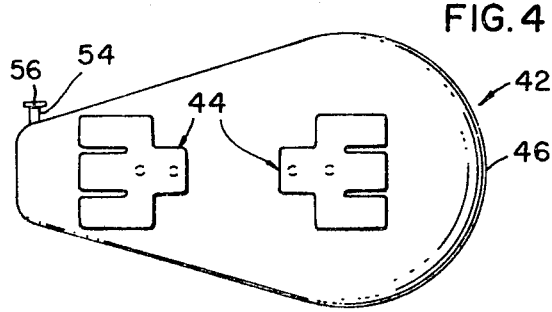
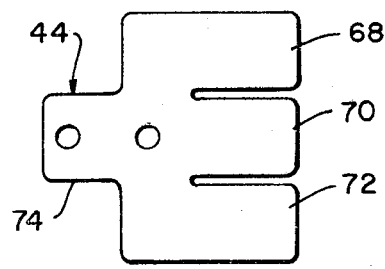
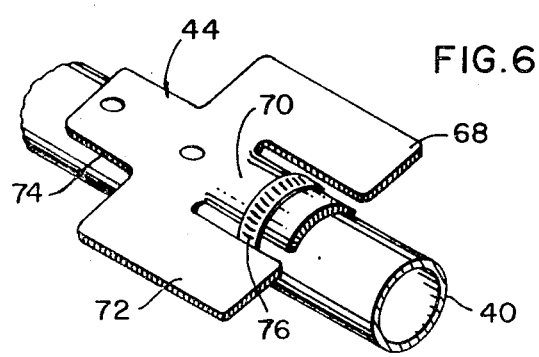
INVENTORS
JACK A. PURCELL, JR.
JEROME A. LEONARD
JOHN S. JURATOVIC
BY
BY Russell C. Wells
ATTORNEY

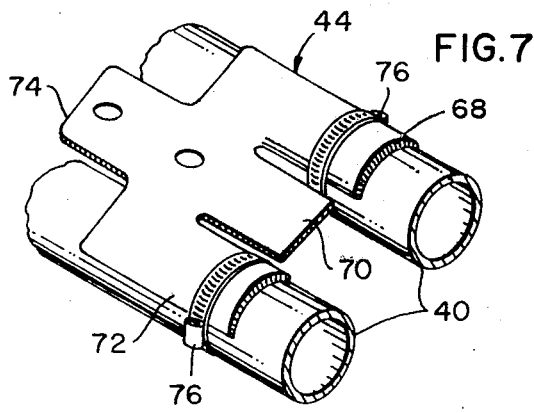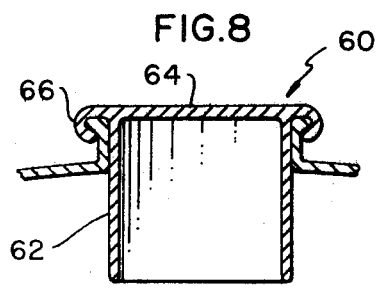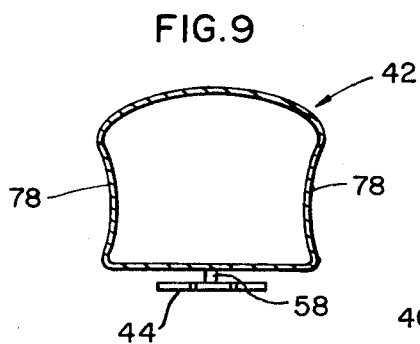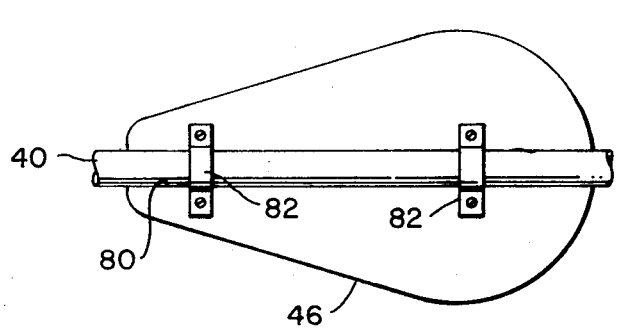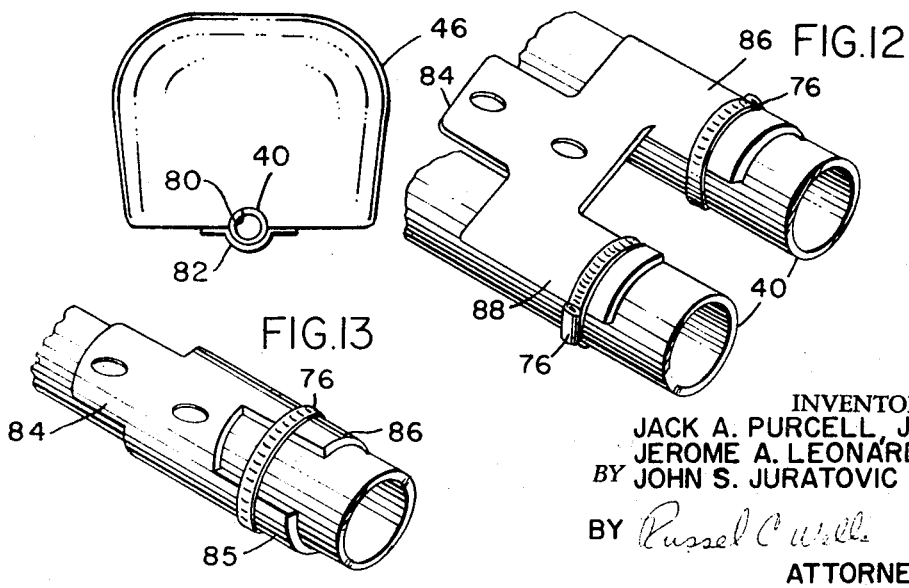

3,741,429

BICYCLE CANTEEN

BRIEF DESCRIPTION OF PRIOR ART

This disclosure relates in general to tanks for containing liquids and in particular to a canteen for mounting on a bicycle or other similar vehicle. When a cyclist desires to carry liquids for refreshment while traveling on his bicycle, he is forced to carry either a canteen strapped about his waist, carried around his neck, or strap containers such as those used by racers to the handlebars.

It is a principal object of this invention to provide a bicycle canteen which is fixedly mounted to the frame of the bicycle.

It is another object of this invention to provide an integral cap and cup member for use with a bicycle mounted canteen.

It is a further object of this invention to provide a universal clamping means adaptable to mount the canteen to the frame of the bicycle regardless of the construction of the bicycle frame.

In accordance with these and other objects which will become apparent, there is described and claimed herein a canteen for mounting on the crossbar of a bicycle. The canteen comprises a hollow enclosed body member adapted to contain a volume of liquid. Inlet means is provided in one surface of said body member for receiving the liquid to be contained therein. A removably insertable cap means is engagable with said inlet means forming a leak proof seal therewith to retain the liquid within said body member. An outlet means is positioned along the surface of the body member for controllably removing an amount of liquid therefrom. Clamping means positioned on a surface of said body member opposite the surface having the inlet means is cooperable with the crossbar of the bicycle for securing said body member rigidly to the crossbar of the bicycle.

IN THE DRAWINGS

FIG. 1 is an elevation view of a bicycle with the canteen mounted on the crossbar thereof;

FIG. 2 is a side view of the canteen;

FIG. 3 is a top view of the canteen;

FIG. 4 is a bottom view of the canteen;

FIG. 5 is a plan view of the preferred embodiment of the clamp for the canteen;

FIG. 6 is a partial view illustrating the clamp of FIG. 5 secured to a single crossbar;

FIG. 7 is a partial view illustrating the clamp of FIG. 5 secured to a dual crossbar;

FIG. 8 is a partial section view taken along line 8—8 of FIG. 3;

FIG. 9 is a sectional view taken along line 9—9 of FIG. 2 showing the contoured knee pads of the canteen;

FIG. 10 is a bottom view of a canteen illustrating a modification of the clamps;

FIG. 11 is an end view of the modification of FIG. 10;

FIG. 12 is another modification of the clamp of FIG. 5 secured to a single crossbar; and FIG. 13 is the modification of FIG. 12 secured to a dual crossbar.

DETAILED DESCRIPTION

Referring to the figures by the characters of reference, there is illustrated in FIG. 1 a bicycle 20 having a seat or saddle 22 position substantially above or over the rear wheel 24 and the handlebar 26 operatively connected through a fork member 28 to the front wheel 30. A frame 32 interconnects the fork member 28 at one end with the rear wheel 24 at the other end. The frame 32 comprises several tubular members such as a seat supporting member extending between the seat and the sprocket housing 36; a lower crossbar member extending from the fork member 28 to the sprocket member and a main crossbar member 40 extending from the fork member 28 to the rear wheel axle. Of particular interest, in the present specification is the main crossbar member 40 which according to the particular construction of the bicycle 20 may be either a single or dual tubular member.

Mounted on the main crossbar 40 and interposed in the space between the forward edge of the seat 22 and the handlebars 26 is a canteen 42 according to the present invention. The canteen is secured to the main crossbars 40 by a pair of clamping means 44 which are deformed around the tubular crossbar. The canteen 42 in the preferred embodiment takes the speed-form shape of fuel tanks such as may be found on motorcycles or similar vehicles. The purpose of the canteen in the preferred embodiment is to carry a predetermined volume of liquid such as water which may be used at the convenience of the cyclist. It is to be understood that while a bicycle is illustrated, the canteen 42 may also be used on tricycles without departing from the spirit of the invention contained herein.

The canteen 42 as illustrated in FIGS. 2, 3 and 4 comprises a hollow enclosed body member 46 having a general aerodynamic speed-form shape. As will become obvious, the body member may be constructed of an insulating material. Positioned along the upper surface of the body member 46 as illustrated in FIG. 1, is an inlet means 48 for receiving the liquid to be contained therein. As illustrated in FIG. 2, the inlet means comprises a short tubular member 50 extending outwardly from said body member 46 in the form of a neck. An annular member 52 is secured to the outward rim of the tubular member 50 and, as will hereinafter be shown, provides a secure clamp for a cap member.

Positioned on a side surface or on the bottom surface and substantially opposite the inlet means 48 is an outlet 54 for discharging the liquid from within the hollow body member 46. The outlet is covered or enclosed by a cap 56 which when positioned as illustrated in FIGS. 3 and 4 provide a liquid tight seal preventing the discharge of liquid from within the body member. The outlet cap 56 is a detachable cap which may be secured to the body member by such means as a living or flexible hinge. Referring to FIG. 1, the outlet 54 is positioned on the lower side or bottom of the canteen 42 nearest the seat 22.

Positioned along the bottom surface of the body member 46 and symmetrical about the vertical longitudinal axis of the canteen 42 are clamping means 44 which cooperate with the main crossbar 40 to hold the canteen 42 in a predetermined fixed position. The clamping means 44 are spaced from the bottom surface of the body member by short extensions 58 and are cantileverly mounted thereto. The calmping means extends in a plane substantially parallel to the bottom surface of the body member 46.

Referring to FIG. 8, there is illustrated in the sectional view taken through the inlet means 48 the preferred embodiment of a cap member 60. In the preferred embodiment the cap member is a tubular member 62 terminated at one end by a lid 64. The lid member 64 has a rim portion 66 which is congruent to the annular member 52 of the inlet 48. The tubular member 62, the lid 64 and the rim portion 66 form a unitary member which is detachable from the body 46. The rim portion 66 and the annular member 52 of the inlet cooperate to form a snappable engagement to form a liquid-proof seal therebetween. In the preferred embodiment when the cap 60 is disengaged from the body member 46 and removed therefrom, the cap may be inverted forming a cup or receptacle into which the liquid within the body member may be discharged.

The clamping means 44 may be an elongated, flat, deformable flexible member or finger which is cantileverly mounted to the body member. Referring to FIG. 5, there is illustrated the preferred embodiment of the clamping means 44 having three spaced apart fingers 68, 70 and 72 which extend in a direction of length away from the cantilever mounting portion 74. The clamping means 44 and, in particular, the fingers 68, 70 and 72 are fabricated from a relatively thin flexible deformable material which permits the fingers to be deformed about the crossbar member as illustrated in FIGS. 6 and 7. As previously indicated, the main crossbar 40 may comprise one tubular member or a pair of spaced apart tubular members and the clamping means 44 as illustrated in FIG. 5 functions as a universal clamping member adaptable to either configuration of crossbar 40. FIG. 6 illustrates the clamping means 44 as used or clamped to a single tubular crossbar. In such an environment, for reasons of balance and positioning, the center or middle finger 70 is used to secure the canteen 42 to the main crossbar 40. Since the material of the finger is a flexible deformable material, the securing means 76 wraps around the finger 70 and the crossbar 40 causing the finger to take the general shape of the main crossbar 40. The securing means 76 may be any form of clamp commonly associated with a tubular member or any one of the commercially available strap type clamps which when drawn tight are fixedly secured. The wrapping or deforming of the finger 70 about the crossbar extends the gripping surface of the finger holding the clamp and through the clamp the canteen 42 in a predetermined fixed position.

FIG. 7 is a view similar to that of FIG. 6 but illustrates the use of the clamp 44 on a dual tubular crossbar member 40. As illustrated, the fingers 68 and 72 are deformed about the tubular crossbars 40 and are secured by a securing means 76 as illustrated in FIG. 6. Since the fingers 68 and 72 are equally spaced about the center line of the clamp 44, the canteen 42 is symmetrically positioned or balanced on the crossbar.

In a modification of the clamping means illustrated in FIGS. 12 and 13, the clamping means may be a flexible deformable Y-shaped member 84 cantileverly mounted at the body end of the Y. The two arms 86 and 88 of the member which are preferably parallel to each other extend in a direction parallel to said body member 46. Suitable securing means 76 is detachably engaged with each of said arms for securing the canteen to the crossbar of the cycle. If the cycle is a single tubular crossbar, both arms may be positioned along the crossbar as illustrated in FIG. 13 and likewise with a dual crossbar, one arm will be formed about each crossbar as illustrated in FIG. 12.

In the preferred embodiment of the canteen 44 the entire construction of the body member 46, the inlet means 48, the outlet 54 and the extensions 58 are of a unitary molded construction. The molding material is a thermoplastic resin material and it is obvious to one skilled in the art that the contour of the body member 46 may be easily altered such as illustrated in the cross-sectional view of FIG. 9. The area 78 may be general concave surface taking the shape of a contoured knee pad such as found on the fuel tanks of a motorcycle or similar vehicle. Such a shape is merely ornamental and not dictated by the structural integrity of the canteen 42. The clamping means 44 are secured to the extensions 58 by any securing means such as heat preening or hot staking. If such a process is followed, the clamping means essentially becomes integral with the body member 46.

It is obvious to one skilled in the art that several different forms of clamps may be used to secure the canteen to the crossbar. FIGS. 10 and 11 illustrate a modification wherein the clamping means comprises an elongated channel which is molded along the longitudinal center line of the bottom surface of the body member 46. The width of the channel 80 may be such as to accommodate either configurations of the main crossbar 40. Removably secured to the body member 46 in FIGS. 10 and 11 is at least one bar clamp 82 extending across the width of the channel 80. The bar clamp 82 may well have a center arcuate portion which is congruent to the tubular shape of the crossbar 40 providing a clamping action between the bottom of the channel and the arcuate section.

There has, thus, been described a canteen for mounting on the crossbar of a bicycle or other similar vehicle for containing a volume of liquid. The canteen 42 is essentially a unitary structure comprising an elongated speed-form shape hollow body member which is capable of containing a volume of a liquid. Located along an upper surface of the body member is an inlet for receiving the volume of liquid into the body member. The rim of the inlet which may be flush with the upper surface of the body member or extend outwardly thereof cooperates with a cap to form a liquid tight seal. The cap and the inlet rim are detachably engageable with one another. Positioned on a lower surface of the body member 46 is an outlet for discharging liquid from the canteen. Clamping means are cantileverly supported along the bottom surface and particularly symmetrical about either side of the vertical center line of the canteen for clamping the canteen to the main crossbar of the bicycle. The clamping member is formed of a flexible deformable material which when used with a securing means forms about the crossbar holding the canteen rigidly in position.

What is claimed is:

1. A canteen for mounting on the crossbar of a cycle comprising:
   a hollow enclosed body member adapted to contain a volume of liquid;
   inlet means in one surface of said body member for receiving liquid to be contained therein;
   cap means removably insertable into said inlet means, said cap means cooperable with said inlet means for closing said inlet retaining the liquid therein;
   outlet means in said body member for controllably removing an amount of liquid therefrom;

a flexible deformable member cantileverly mounted to the bottom surface of said body member, said member spaced away therefrom and extending substantially parallel thereto; and securing means detachably engageable with said flexible member for securing said member to the crossbar of a cycle;

wherein said member deforms about the crossbar when secured thereto by said securing means.

2. The canteen according to claim 1 wherein said deformable member is a flexible, deformable Y-shaped member cantileverly mounted at the body end of said Y with the two arms thereof disposed from said body member and extending substantially parallel thereto.

3. A canteen for mounting on the crossbar of a bicycle, said canteen comprising:

an elongated hollow enclosed rigid member capable of containing a volume of liquid, an inlet positioned on one surface of said member for receiving a volume of liquid into said member, a tubular member extending outwardly from said inlet and secured thereto in a liquid-proof seal, an annular member secured to the rim of the outward end of said tubular member, a cap member having a rim congruent to said annular member, said cap member detachably engageable with said annular member, an outlet positioned on a surface substantially opposite to the surface containing said inlet, said outlet for regulating the discharge of liquid from said hollow member;

a flexible, deformable clamping member cantileverly mounted on the bottom surface of said hollow rigid member and disposed therefrom, said clamping member having at least one finger extending from one end thereof, and securing means cooperating with said clamping member for deforming said finger around a crossbar of a bicycle and operable to secure said finger thereto thereby holding said hollow rigid member in a predetermined position on the crossbar.

4. The canteen according to claim 3 wherein said cap member is a tubular member enclosed at one end thereof, said enclosed end having a rim congruent to said annular member and the open end of said cap extending into said rigid member when said cap is engaged with said annular member.

5. The canteen according to claim 3 wherein said clamping member has three spaced apart fingers extending away in the direction of length of said member from one end thereof.

* * * * *